United States Patent Office 3,007,461
Patented Nov. 7, 1961

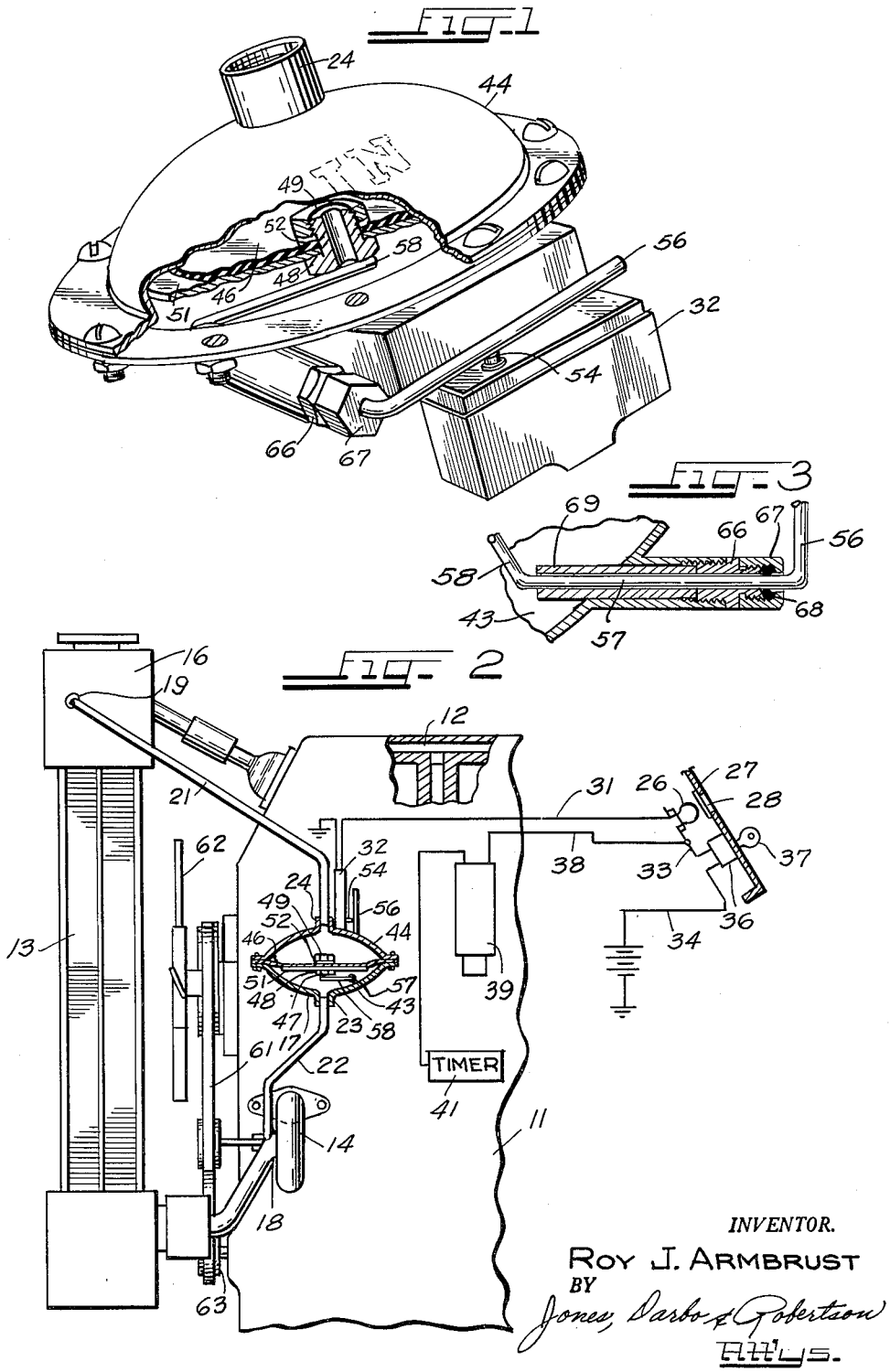

3,007,461
DETECTION SYSTEM FOR COOLANT FAILURE
Roy J. Armbrust, 2S501 Oaklawn, Glen Ellyn, Ill.
Filed Mar. 17, 1960, Ser. No. 15,583
8 Claims. (Cl. 123—41.15)

Although various devices have been proposed for warning the driver of a vehicle having a water-cooled engine of the failure of the water-cooling system, none commercially has been really satisfactory and dependable. The usual thermometer on the instrument panel indicating engine temperature is inadequate because it is likely not to show a noticeable abnormality until damage has already been done. It does not give warning when the water is just a little low to give a driver a chance to keep driving and look for a service station. A level gauge will never show a failure for any reason other than the lowering of the coolant level, so that a pump failure would not be detected until the coolant had boiled away enough to bring the level down to the detected point.

According to the present invention, a single and reasonably inexpensive device provides an alarm signal whenever the water pump fails, and also whenever the water level drops enough so that a dangerous condition can be expected to follow. This is accomplished by a surprisingly simple expedient of using a flow detector connected between the water pump intake and a level in the water reservoir above any immediate danger level but below the range of normal operation. As long as the water pump is operating and the water is above the level of the connection to the flow detector, a switch operated by the flow detector will maintain the signal inoperative. But at all other times, the signal will give its indication if the ignition switch is on. During normal operation the appearance of this indication will be a warning signal. Upon initially turning on the ignition to start the engine the appearance of the indication, followed upon starting the engine by disappearance of the indication, will be reassurance that the system is properly functioning.

Additional objects and advantages of the invention will be apparent from the following description and from the drawings.

Designation of figures

FIG. 1 is a diagrammatic representation of a system embodying the present invention.

FIG. 2 is a perspective view, partially broken away, of a flow detector suitable for use in FIG. 1.

FIG. 3 is a fragmentary sectional view approximately along the axis of the crank rod of the flow detector shown in FIG. 2.

General description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As indicated diagrammatically in FIG. 1, this invention will be used in connection with an engine 11 having passages 12 for water or other coolant liquid which is cooled in a radiator 13 and pumped through both the coolant passages 12 and the radiator 13 by a water pump 14. A reservoir 16 is in or connected to the circuit to maintain a sufficient supply of water in spite of minor losses of water. According to the present invention a flow detector 17 is connected between the pump intake 18 and the reservoir 16. The connection 19 of the flow detection system to the reservoir 16 is at a low but safe level so that water will be drawn into pipe 21 when the water level in reservoir 16 is within its normal operating range.

Pipe 22 connects the outlet connection 23 of flow detector 17 with the intake 18 of the water pump 14. Pipe 21 connects the inflow connection 24 of the flow detector 17 with the connection 19.

A light or other warning signal 26 is positioned to be observed by the driver of the vehicle. In the case of a light it will naturally be located behind the instrument panel 27, perhaps illuminating a red filter 28 to be viewed through the instrument panel 27. The lamp is connected by wire 31 to a switch 32 which is a "normally closed" switch in the sense that it completes the circuit of wire 31 except when the flow detector 17 operates the switch 32 to open the circuit, in response to detection of flow. Lamp 26 is connected by wires 33 and 34 to a battery which completes the circuit through ground (the engine, frame and body) whenever ignition switch 36 is turned on by ignition key 37. The wire 33 may also supply wire 38 to the ignition system represented by spark coil 39 and the timer unit represented by box 41. This would be in the distributor housing and would include the usual breaker "points."

Flow detector

The flow detector 17 comprises a pair of bowls 43 and 44 between which a diaphragm 46 is clamped by a series of screws through the peripheral flanges of the bowls. The diaphragm 46 separates the housing formed by bowls 43 and 44 into two chambers connected only by a restricted connecting passage 47. The restricted connecting passage may conveniently be in a headed fitting 48 which is externally threaded on its tubular body to receive a nut 49. The fitting 48 and nut 49 clamp a disk 51 and a washer 52 against opposite sides of flexible diaphragm 46.

The operating nib 54 of switch 32 is normally pressed outwardly by spring tension within switch 32. This may bear against lever arm 56 of a crank rod 57 having a lever 58 at the other end thereof on which fitting 48 rests. When no water is flowing through flow detector 17, the force of the spring within switch 32 is sufficient to move it outwardly overcoming the friction of crank rod 57 and the weight of the diaphragm, so that the switch 32 moves itself to its normal or relaxed condition in which it closes the contact therein.

Water pump 14 draws water through intake 18, this creates a suction in pipe 22 which draws water from bowl 43 causing a reduced pressure in the chamber within bowl 43, so that the weight of water on diaphragm 46 and the water pressure produced by pipe 21 cause the diaphragm 46 to be lowered, turning the crank represented by levers 58 and 56 and rod 57 in a counterclockwise direction as seen in FIG. 1, thereby pressing in the switch nib and actuating the switch 32 to the open or circuit breaking condition. Switch 32 is a "normally closed" type of switch, although during use it is usually held in "open" condition.

Passage 47 is of small enough cross sections so that it will cause a substantial pressure drop due to the flow through pipes 21 and 22 when the pump 14 is operating, and also small enough so that the flow through the flow detector path will be negligible compared to the main intake of pump 14. Both because of the small quantity of water which flows through the flow detector 17 and because of the fact that even this small quantity of water becomes cooled as it flows through conduit means including pipes 21 and 22, this invention represents no loss of cooling efficiency.

Operation

When the driver turns the key 37 to start the engine 11, there will be no flow at the moment through flow detector 17 and switch 32 will be in its normally closed condition. Accordingly the light 26 will be illuminated and will be seen by the driver through its window in the instrument panel 27. As soon as the engine starts, if all is well, pump 14 will be driven and will create a suction in pipe 22 and bowl 43. This will draw the diaphragm 46 downwardly and operate switch 32 to turn off warning light 26, thereby reassuring the driver that the system is operating properly. If the level of standing water in reservoir 16 falls below connection 19, no water will be drawn through connection 19, since it is out of the line of the pumped flow from engine 11. Hence, water initially remaining in pipe 21 and bowl 44 will be drawn through passage 47, whereupon there will be no weight or hydrostatic pressure applied to diaphragm 46 to maintain the switch 32 actuated, and its internal spring will thrust out nib 54, raising diaphragm 46, and causing closing of the contact within switch 32. This will cause warning light 26 to be illuminated and it will remain illuminated until the condition is remedied or the ignition key 37 is turned "off."

If water pump 14 fails to operate, there is no longer any suction in pipe 22 or in bowl 43, and for that reason the internal spring of switch 32 can press the nib 54 outwardly restoring the switch 32 to its "normally closed" condition closing the circuit to warning light 26 and in this additional situation the operator can be warned of trouble.

In some vehicles, the water pump 14 is driven by a belt 61 which also drives fan 62, the belt being driven by a drive pulley 63 driven by the engine 11. This is an ideal system from the standpoint of utilization of the present invention, because breakage or excessive looseness of fan belt 61 is also announced to the driver by illumination of warning lamp 26. Even when the fan 62 is not thus driven jointly with the pump 14, the warning lamp 26 would usually be illuminated before any damage is done. In case the driver fails to notice the high temperature resulting when the fan 62 stops being driven, the water will boil away until its level is below the connection 19, at which time the warning light 26 will be illuminated. Although the engine temperature will have been higher than is desirable in the meantime, it usually will not have been high enough for any serious damage to have occurred, as would have occurred fairly soon after this manner of signal operation if the water continued to evaporate until it no longer filled the cooling passages in the engine.

When during a trip the driver is warned of a failure by illumination of warning lamp 26, he should immediately stop the car and check to see whether it is safe to drive further. If there has merely been a slow dissipation of water so that the water remains just below the connection 19, he will usually be able to drive to a service station where he can have the matter attended to. If there has been a normal reason for dissipation of considerable water since the radiator was last filled, he may merely fill the radiator and drive on. With modern pressurized cooling systems, however, the illumination of warning light 26 during the trip, even after hundreds of miles of driving since the radiator was checked, will usually mean a failure that should be remedied, unless there have been exceptionally severe driving conditions.

The invention is especially suitable for use on trucks or other engines which are likely to be subjected to operating conditions causing relatively fast dissipation of the water. For engines encountering such conditions, it is extremely desirable to have a system such as is provided by this invention which will give a warning before damage has occurred and usually before it is even about to occur.

Some engine designers using a pressurized cooling system prefer to allow engine operation above the boiling point. An alarm operated by a thermostat set to permit above-boiling temperatures would fail to give warning if a leak should cause loss of pressure, because then the water could boil away without reaching the above-boiling temperature required to actuate the alarm. The flow detector of this invention is unaffected by system pressure.

The flow detector does not need to be below connection 19. As long as water is drawn in at connection 19, the suction is largely confined to the chamber between diaphragm 46 and bowl 43 and hence the diaphragm is drawn down to detect the flow.

It is not essential that the connection 19 be above the level of the surfaces to be cooled in coolant passages 12. The water will be pumped to fill these passages even if the water level in reservoir 16 is lower. The connection must be high enough so that if water is that high in the reservoir and radiator combination the pump 14 will draw and pump water consistently and uniformly. One of the most damaging conditions frequently encountered without this invention is erratic pumping due to low water level on the intake side of the pump. This causes rapid changes in temperature of various parts of the engine, even though the engine thermometer may show little overall change of temperature. The location of connection 19 above the coolant passages is preferred, when there is plenty of storage capacity above connection 19, so that in the event of pump failure the coolant passages will still be full.

For use with stationary engines, the flow detector 17 can shut off the engine instead of providing an alarm signal, or it can do both. Thus the switch 32 can have a terminal leading to a normally open contact within switch 32, and this contact can be connected in series with the ignition after the engine has started, to break the ignition circuit when the flow detector detects lack of flow. Both the alarm and ignition circuit when controlled by the flow detector may be classed as safety circuits.

The alarm could comprise a buzzer or bell instead of, or in addition to, the lamp 26, and for engines not always closely attended may include an alarm remote from the engine.

Some inferior systems for detecting coolant failures may be within the broader aspects of this invention. A flow detector that is connected electrically as illustrated, but which is responsive to any sufficient flow through the pump, or to sufficient suction at the intake thereof, to hold the warning signal "off" would have some advantage over known prior art systems. It would lack the ability of the preferred form of the invention to warn in advance of trouble, however, unless in some manner dependent on an adequate level of standing water in the radiator and reservoir combination.

There are additional considerations that contribute to the high reliability of the preferred form of the invention. For example, crank rod 57 is quite free in bearing fitting 66, and its angular movement is small enough to be accommodated by resilient torsion of O ring seal 68 which is lightly squeezed between fitting 66 and nut 67. Axial positioning is accomplished by loose sleeve 69.

Also, the flowing of water through the flow detector instead of through an external restricted bypass (which would also work) safeguards against failure due to accumulation of debris in the flow detector.

I claim:

1. The combination of an engine having passages for a coolant liquid and the operation of which requires operation of an operation controller, a radiator, connections connecting said radiator and said passages in a cooling circuit, a pump for circulating liquid through said circuit and having a suction connection and a discharge connection, a reservoir located at least in part above said passages, conduit means including a flow detector connected at one end to be subject to suction in said suction connection and connected at the other end to draw coolant from the standing contents of said reservoir at a point above the level of the passages, a switch operated by the operation controller for said engine, a normally closed switch associated with the flow detector to be opened in response to flow detection by said flow detector, a signal light visible to the operator of said operation controller, connected in a series circuit with both of said switches in series and with a source of power, whereby upon operating the operation controller for starting the engine the signal light will be visible to the operator, said light being extinguished when the engine starts and coolant liquid is pumped and drawn through conduit means, but whereby said light again becoming illuminated if coolant liquid ceases to be drawn through the flow detector either due to failure of the pump or a lowering of the level of the standing coolant liquid below the connection of the flow detector to the reservoir.

2. The combination of an engine having passages for a coolant liquid, a radiator, connections connecting said radiator and said passages in a cooling circuit, a pump for circulating liquid through said circuit and having a suction connection and a discharge connection, a reservoir located at least in part above said passages, conduit means including a flow detector, connected at one end to be subject to suction in said suction connection and connected at the other end to draw coolant from the standing contents of said reservoir and radiator at a level substantially higher than that of the suction connection and means responsive to the flow detector to indicate when coolant liquid fails to flow through said flow indicator during the operation of said engine.

3. The combination of an engine having passages for a coolant liquid formed in part by surfaces to be cooled, a radiator, a pump having a suction connection and a discharge connection, conduits connecting said radiator, pump and passages in a cooling circuit, a reservoir connected to said circuit and located at least in part above said passages, conduit means including a flow detector, connected at one end to be subject to suction in said suction connection and connected at the other end to draw coolant from the standing contents of said reservoir and radiator at a level substantially higher than that of the suction connection, and means responsive to the flow detector to indicate when coolant liquid fails to flow through said flow indicator during the operation of said engine.

4. The combination of an engine having passages for a coolant liquid formed in part by surfaces to be cooled, a radiator, a pump having a suction connection and a discharge connection, conduits connecting said radiator, pump and passages in a cooling circuit, a reservoir connected to said circuit and located at least in part above said passages, conduit means including a flow detector, connected at one end to be subject to suction in said suction connection and connected at the other end to draw coolant from the standing contents of said reservoir at a point substantially as high as the uppermost of said surfaces, alarm means, means tending to activate the alarm means when the engine is running, and means responsive to flow detection by the flow detector to keep said last named means ineffective.

5. The combination of an engine having passages for a coolant liquid formed in part by surfaces to be cooled, a radiator, a pump having a suction connection and a discharge connection, conduits connecting said radiator, pump and passages in a cooling circuit, alarm means, means tending to activate the alarm means when the engine is running, and means responsive to coolant flow induced by the pump to keep said last named means ineffective.

6. The combination of an engine having passages for a coolant liquid formed in part by surfaces to be cooled, a radiator, a pump having a suction connection and a discharge connection, conduits connecting said radiator, pump and passages in a cooling circuit, alarm means, means tending to activate the alarm means when the engine is running, and means responsive to suction in the suction connection of the pump to keep said last named means ineffective.

7. The combination of an engine having passages for a coolant liquid formed in part by surfaces to be cooled, the operation of said engine requiring operation of an operation controller; a radiator, a pump having a suction connection and a discharge connection, conduits connecting said radiator pump and passages in a cooling circuit, a switch operated by the operation controller for said engine, a normally closed type of switch associated with the pump to be opened when said pump is pumping liquid, a signal light visible to the operator of said operation controller, connected in series circuit with both of said switches in series and with a source of power.

8. The combination of an engine having passages for a coolant liquid, a radiator, connections connecting said radiator and said passages in a cooling circuit, a pump for circulating liquid coolant through said circuit and having a suction connection and a discharge connection, a reservoir located at least in part above said passages, conduit means including a flow detector, connected at one end to be subject to suction in said suction connection and connected at the other end to draw coolant from the standing contents of said reservoir and radiator at a level substantially higher than the suction connection so that with coolant standing at that level the pump will draw coolant uniformly, a switch controlled by the flow detector to be actuated when coolant ceases to flow through said flow indicator, and safety circuit means controlled by said switch.

References Cited in the file of this patent
UNITED STATES PATENTS

| | | |
|---|---|---|
| 1,773,756 | Schlaich | Aug. 26, 1930 |
| 2,327,558 | Reavis | Aug. 24, 1943 |